United States Patent
Wang

(10) Patent No.: US 7,600,253 B1
(45) Date of Patent: Oct. 6, 2009

(54) ENTITY CORRELATION SERVICE

(75) Inventor: Wei-Lung Wang, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/196,165

(22) Filed: Aug. 21, 2008

(51) Int. Cl.
- *H04L 9/32* (2006.01)
- *G06F 9/00* (2006.01)
- *G06F 7/04* (2006.01)
- *G06F 15/16* (2006.01)
- *G06F 17/30* (2006.01)

(52) U.S. Cl. ............... 726/10; 726/9; 713/159; 713/156; 713/172; 705/50; 705/51

(58) Field of Classification Search .......... 726/9, 726/10; 705/50, 51; 713/155, 156, 159, 713/172
See application file for complete search history.

(56) References Cited

U.S. PATENT DOCUMENTS

| | | | | |
|---|---|---|---|---|
| 7,062,279 | B2 * | 6/2006 | Cedervall et al. | 455/456.3 |
| 7,073,174 | B2 * | 7/2006 | Volkoff et al. | 718/102 |
| 7,207,069 | B2 * | 4/2007 | Foster et al. | 726/30 |
| 7,296,290 | B2 * | 11/2007 | Barriga et al. | 726/8 |
| 7,349,869 | B2 * | 3/2008 | Oakeson et al. | 705/26 |
| 7,376,840 | B2 * | 5/2008 | McCann et al. | 713/185 |
| 7,533,265 | B2 * | 5/2009 | Ballinger et al. | 713/172 |
| 2002/0062346 | A1 * | 5/2002 | Chen | 709/204 |
| 2002/0184137 | A1 * | 12/2002 | Oakeson et al. | 705/37 |
| 2002/0184240 | A1 * | 12/2002 | Volkoff et al. | 707/200 |
| 2002/0184294 | A1 * | 12/2002 | Volkoff et al. | 709/104 |
| 2002/0194245 | A1 * | 12/2002 | Simpson et al. | 709/101 |
| 2003/0074401 | A1 * | 4/2003 | Connell et al. | 709/203 |
| 2004/0064707 | A1 * | 4/2004 | McCann et al. | 713/185 |
| 2004/0203900 | A1 * | 10/2004 | Cedervall et al. | 455/456.1 |
| 2005/0039054 | A1 * | 2/2005 | Satoh et al. | 713/201 |
| 2005/0108575 | A1 * | 5/2005 | Yung | 713/201 |
| 2005/0160298 | A1 * | 7/2005 | Reno | 713/202 |
| 2005/0254514 | A1 * | 11/2005 | Lynn | 370/450 |
| 2006/0189328 | A1 * | 8/2006 | Cedervall et al. | 455/456.3 |
| 2007/0044143 | A1 * | 2/2007 | Zhu et al. | 726/8 |
| 2007/0067383 | A1 * | 3/2007 | Savchenko et al. | 709/203 |
| 2007/0067411 | A1 * | 3/2007 | Angelov | 709/217 |
| 2007/0067461 | A1 * | 3/2007 | Savchenko et al. | 709/227 |
| 2007/0067494 | A1 * | 3/2007 | Savchenko et al. | 709/246 |
| 2007/0133763 | A1 * | 6/2007 | D'Angelo et al. | 379/93.02 |

(Continued)

*Primary Examiner*—David Garcia Cervetti
(74) *Attorney, Agent, or Firm*—Yee & Associates, P.C.; Ronald A. Kaschak

(57) ABSTRACT

A computer-implemented method for correlating entities between a service provider and a service requester is provided. The computer-implemented method receives a request for a service from a service requester and determines whether the request contains an entity token representative of an entity referenced by the service requester that can be resolved. When the entity token is not resolved, the entity token is sent to a token correlator that requests the service requester, or an authorized party, to provide entity information. The token correlator forwards the entity information to the service provider to validate and return encrypted to the token correlator from which is generated a new entity token. The new token is sent to the service provider and, selectively, to the authorized third party, and used for locating the service of the request by the service provider. The service is performed with reference to the entity represented by the new entity token to form a service response, and the service response is sent to the service requester, including the new entity token.

1 Claim, 5 Drawing Sheets

U.S. PATENT DOCUMENTS

| | | | |
|---|---|---|---|
| 2007/0136197 A1* | 6/2007 | Morris | 705/44 |
| 2007/0156756 A1* | 7/2007 | Stoyanova | 707/104.1 |
| 2007/0156859 A1* | 7/2007 | Savchenko et al. | 709/220 |
| 2007/0156872 A1* | 7/2007 | Stoyanova | 709/223 |
| 2007/0208936 A1* | 9/2007 | Ramos Robles | 713/168 |
| 2007/0299803 A1* | 12/2007 | Emuchay et al. | 707/1 |
| 2008/0052771 A1* | 2/2008 | Delmond et al. | 726/9 |
| 2008/0109873 A1* | 5/2008 | Kulkarni et al. | 726/2 |
| 2008/0228860 A1* | 9/2008 | Angelov | 709/202 |
| 2009/0037224 A1* | 2/2009 | Raduchel | 705/3 |
| 2009/0064107 A1* | 3/2009 | Chan et al. | 717/120 |

\* cited by examiner

ENTITY CORRELATION SERVICE

BACKGROUND OF THE INVENTION

1. Field of the Invention

The present invention relates, generally, to an improved data processing system and, more specifically, to a computer-implemented method for correlating entities.

2. Description of the Related Art

Service-Oriented Architecture (SOA) allows applications and users to consume services provided by different parties, such as service providers and service requesters. Service requesters are applications or users that request services from a service provider. A service provider may be an application that exposes a service interface for requesters to use. Service-Oriented Architecture typically defines a coupling between service requesters and service providers as loosely coupled.

Service providers advertise their services using Web Service Definition Language (WSDL) files, which service requesters can look up. The web service definition language files may be hosted on the service provider's server or the web service definition language files may be hosted on a central Universal Description Discovery Integration (UDDI), (an industry standard available from OASIS at http://uddi.xml.org/), registry server. Services are generally intended to offer high-level business functions, such as a service to look up employee data. The web services are not intended to offer low-level services like requests to read a particular database record, or to execute a particular Structured Query Language (SQL) statement.

Service-Oriented Architecture presents many advantages to an implementing enterprise. Different organizations can easily expose new services for requesters to use, and because of the loose coupling between service requesters and service providers, it is easy for new services to be added and reused. It is also easy for requesters to use newly-created services, and/or existing services in new sequences, in order to support new business processes.

However, Service-Oriented Architecture also has to deal with data harmonization. Typically, business entities are represented and identified differently in different systems. For example, an employee number may identify an "employee" in a company's human resource system, whereas the same "person" is identified by an email address in an insurance system. The company human resource system may send a request to an insurance service provider to provide the policy coverage and renewal information for the person with employee number 1234. However, the insurance service provider may not be able to process this service request because the insurance company does not know its customers' employee numbers. The insurance company identifies its customer using a different identification scheme of email address.

Furthermore, it is envisioned that a service provider may in turn call other service providers as it services a service request. The technique is referred to as service composition. For example, the insurance service provider may contact a medical records system to obtain medical history information for the person in question before the insurance service provider responds to the human resource system's service request. The medical records system may identify each patient using the patient's driving license number, which is unknown to the insurance system.

A typical approach involves both organizations harmonizing respective data through a common shared understanding. For example, the human resource company and the insurance company agree to use a third identifier to identify their employees/customers. This approach requires that both databases in both organizations be updated with this common third field, and that all service requests between the organizations use the third field as the identifier for the employee/customers. However, in a Service-Oriented Architecture implementation, it is often difficult to know all the partner service providers during database setup time.

With loose coupling, the list of service partners is likely to change over time, causing increased management issues in maintaining the databases with all the common identifiers. Establishing a shared data understanding with each service provider also takes a lot of time, and makes it difficult to implement in a Service-Oriented Architecture implementation when service providers are constantly changing.

Another approach may be to install a translating hub between both organizations. The hubs are commonly referred to as enterprise application integration hubs or messaging hubs. The hubs allow data in a service request to be translated as the request is moved from the service requester to the service provider. For example, a translating hub may intercept all service requests from the human resource company to the insurance company, and replace employee numbers with email addresses. The data mapping may be created dynamically at run time, or through a pre-built database of mapping values. However, this solution approach usually requires that the hub be installed either with a neutral party, or with the requester or service provider.

As with the first approach described above, the loose coupling increases the management issues in many situations because a requester is expected to use different service providers over time, or may make use of multiple providers at one time. The setup and running of the hubs becomes a very expensive proposition because configurations keep changing.

In addition, the described methods typically do not support service composition very well. Service composition occurs when a service provider, of a first tier, calls another service, of a second tier, while fulfilling a service request. In these cases, the second tier service provider also needs correlation information to know which business entity the first tier service provider is referencing.

The current implementations generally require that either a prior understanding be established between the first tier and second tier providers, or a hub be installed between the first tier and second tier providers, with a link to the service requester.

BRIEF SUMMARY OF THE INVENTION

According to one embodiment of the present invention, a computer-implemented method for correlating entities between a service provider and a service requester is provided. The computer-implemented method receives a request for a service from a service requester and determines whether the request contains an entity token representative of an entity referenced by the service requester that can be resolved. When the entity token is not resolved, the entity token is sent to a token correlator that requests the service requester, or an authorized party, to provide entity information. The token correlator forwards the entity information to the service provider to validate and return encrypted to the token correlator, from which a new entity token is generated. The new token is sent to the service provider and, selectively, to the authorized third party, and used for locating the service of the request by the service provider. The service is performed with reference to the entity represented by the new entity token to form a service response, and the service response is sent to the service requester, including the new entity token.

DETAILED DESCRIPTION OF THE INVENTION

Figure 1:
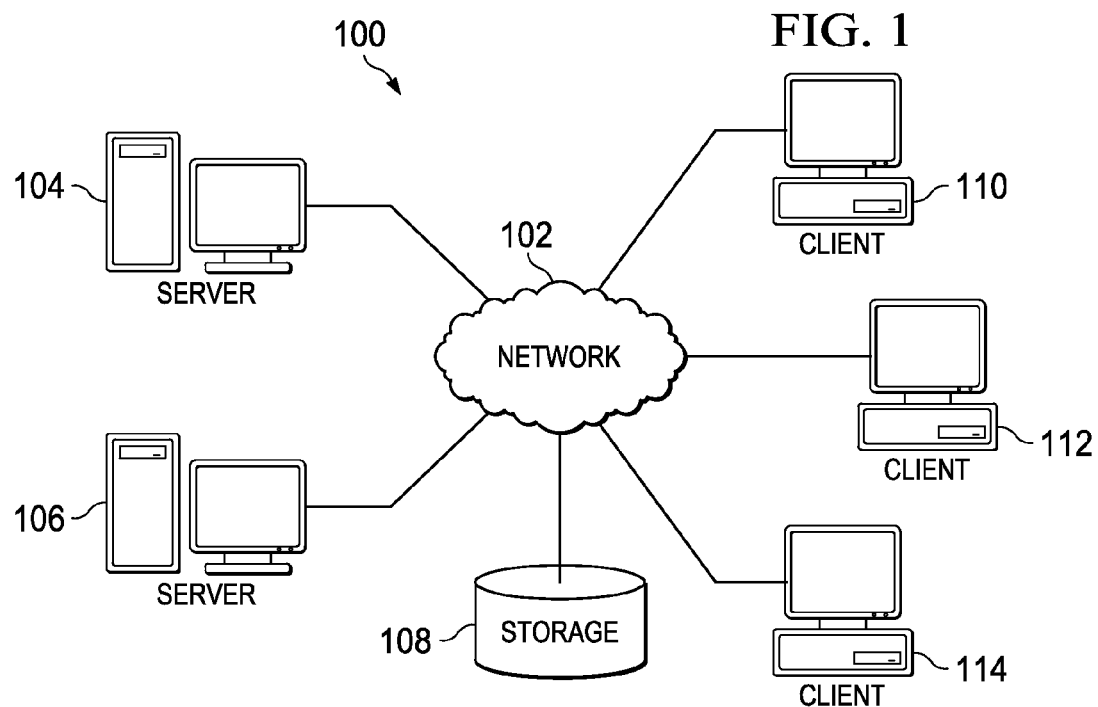
FIG. 1 depicts a pictorial representation of a network of data processing system, in which illustrative embodiments may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by, or in connection with, the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wire-line, optical fiber cable, RF, etc.

Computer program code for carrying out operations of the present invention may be written in any combination of one or more programming languages, including an object-oriented programming language such as Java, Smalltalk, C++, or the like, and conventional procedural programming languages, such as the "C" programming language, or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products, according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer, or other programmable data processing apparatus, create means for implementing the functions/acts specified in the flowchart and/or block diagram block or blocks. These computer program instructions may also be stored in a computer-readable medium that can direct a computer, or other programmable data processing apparatus, to function in a particular manner, such that the instructions stored in the computer-readable medium produce an article of manufacture including, instruction means which implement the function/act specified in the flowchart and/or block diagram block or blocks.

The computer program instructions may also be loaded onto a computer, or other programmable data processing apparatus, to cause a series of operational steps to be performed on the computer, or other programmable apparatus, to produce a computer-implemented process, such that the instructions which execute on the computer, or other programmable apparatus, provide processes for implementing the functions/acts specified in the flowchart and/or block diagram block or blocks.

Figure 2:
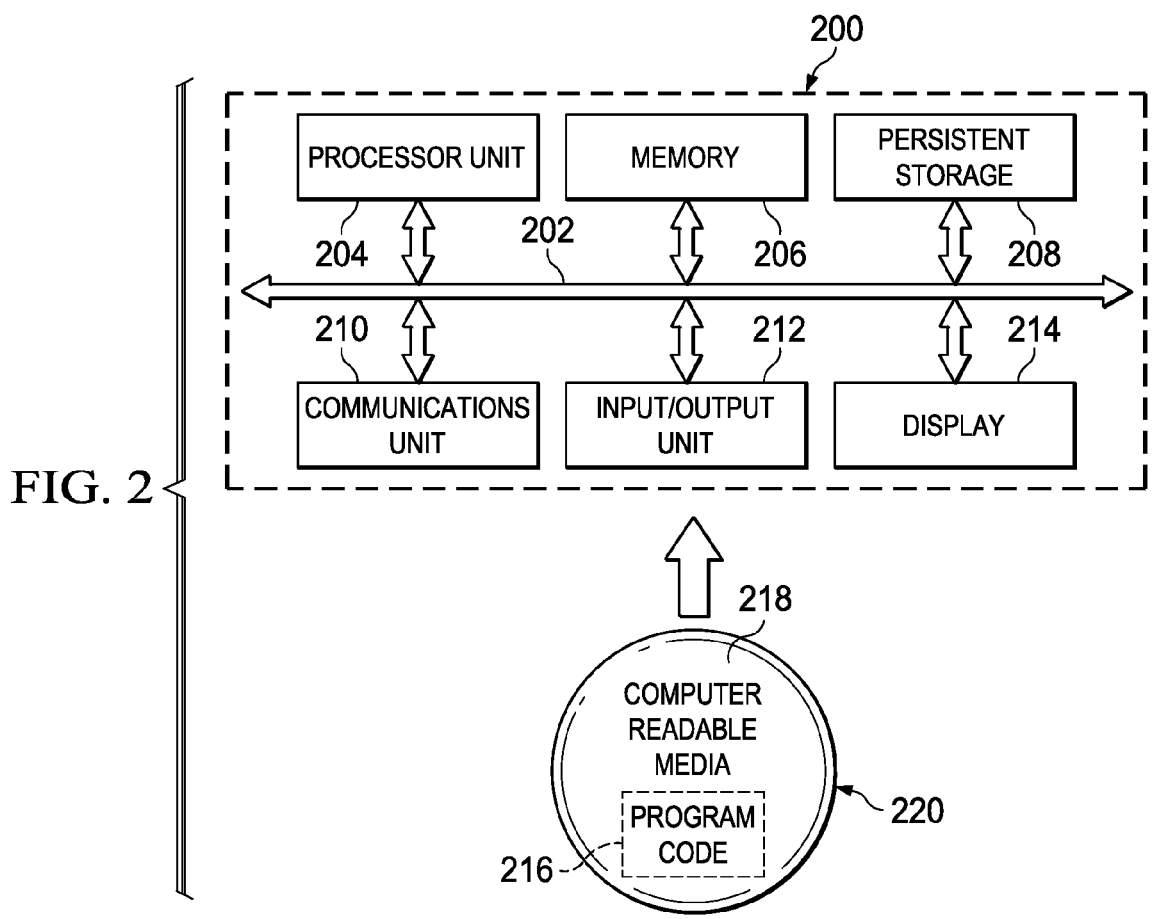
FIG. 2 is a block diagram of a data processing system, in which illustrative embodiments may be implemented.

With reference now to the figures, and in particular with reference to FIGS. 1-2, exemplary diagrams of data processing environments are provided, in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing system in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102, along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes, or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example and not as an architectural limitation for the different illustrative embodiments.

Using system 100 as an example, a service provider on server 104 may be able to correlate entities that it manages with entities referred to by a service requester on server 106 or client 110. The service provider on server 104 uses a distributed token combined with a correlation server, such as server 106, hosted in the service requester's environment. The distributed token provides the correlation needed between the entities of the service provider and the service requester. The correlation server is capable of creating the distributed token from information obtained from a service requester, such as client 110. The correlation server acts as a trusted third party to generate the token between the requesters and the providers. Use of a token ensures the entities being referenced refer to the intended appropriate objects in each the client and server environments.

With reference now to FIG. 2, a block diagram of a data processing system is shown, in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors, or may be a multi-processor core, depending on the particular implementation. Further, processor unit 204 may be implemented using one or more heterogeneous processor systems, in which a main processor is present, with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information, either on a temporary basis and/or a permanent basis. Memory 206, in these examples, may be, for example, a random access memory or any other suitable volatile or non-volatile storage device. Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system, applications or programs are located on persistent storage 208. These instructions may be loaded into memory 206 for execution by processor unit 204. The processes of the different embodiments may be performed by processor unit 204 using computer-implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto, or transferred to, data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-readable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system, including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache, such as found in an interface and memory controller hub that may be present in communications fabric 202.

Figure 3:
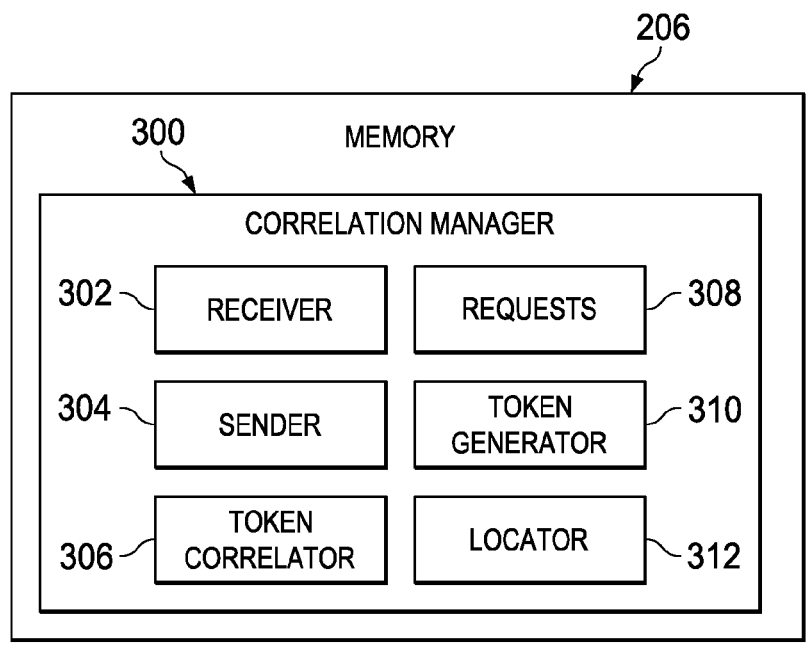
FIG. 3 is a block diagram of components of a correlation manager, in accordance with illustrative embodiments.

With reference to FIG. 3, a block diagram of components of a correlation manager, in accordance with illustrative embodiments, is shown. Correlation manager 300 contains a number of components comprising receiver 302, sender 304, token correlator 306, requests 308, token generator 310, and locator 312. Correlation manager 300 is shown within memory 206 of system 200 of FIG. 2, but may reside in other suitable locations within network system 100 of FIG. 1 as well.

Receiver 302 provides a capability to receive requests 308 from service providers and service requesters. A corresponding sender 304 provides a capability to send a generated token to a requester. Requests 308 is a data structure containing a set of requests for entity tokens submitted by the connected service providers and service requesters to resolve identification issues in their respective situations. The set may comprise one or more requests for an entity token.

Token correlator 306 provides a capability to request information from a requester or an authorized party to create an entity token. Token correlator 306 further comprises token generator 310 and locator 312. Token generator 310 provides a capability of creating a token from information describing an entity used by either a service provider or a service requester. The token is a tamper-evident sequence of data that is accepted by both service provider and service requester. The token is used to provide a correspondence between the entity identifier used by the service provider for a particular entity and the entity identifier used by the service requester for that same entity.

Locator 312 provides a capability to locate a service, service provider or service requester as needed to fulfill the service request.

Figure 4:
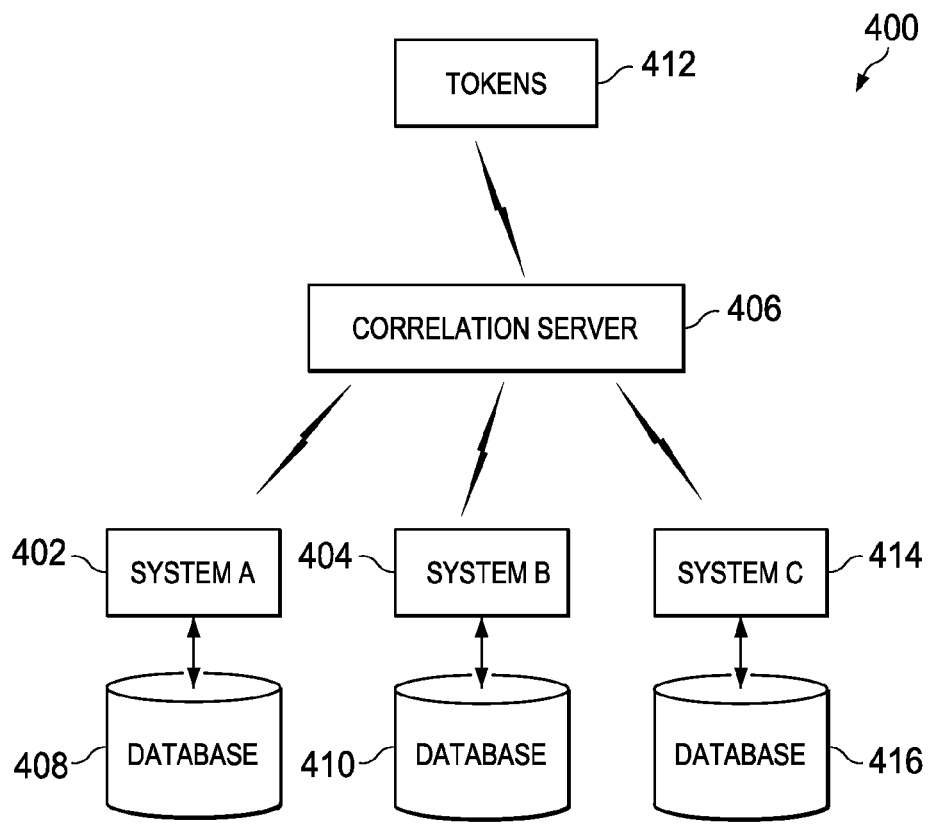
FIG. 4 is a block diagram of a service request flow, in accordance with illustrative embodiments.

With reference now to FIG. 4, a block diagram of a service request flow, in accordance with illustrative embodiments, is shown. The service request flows between systems of the service provider and service requester within the network of systems 400. For example, a service request may be submitted from system A 402 for information from service provider on system B 404. The information needed by system A 402 may be contained in database 410 (DB) of system B 404, but may be referenced differently than the information found in database 408 (DB) of system A 402. System C 414 may also have related information in database 416 (DB) in yet another different form using different terms of reference.

Correlation server 406 provides a set of distributed entity tokens that may be exchanged between system A 402, system B 404 and system C 414. The service of correlation server 406, which may be carried out by correlation manager 300, allows all connected systems to correlate the business entities referenced by respective service requesters and service providers. The entity tokens, such as tokens 412, map the information on the two systems to ensure the two systems are referencing the same proper information, and the appropriate data is exchanged.

If a token could not be resolved by service provider of system B 404, a request may be sent to correlation server 406 for the proper entity token. Correlation server 406 in turn requests service requester system A 402 to provide the needed information to generate the required token. An authorized other party may also provide the information on behalf of system A 402. When the information is received from system A 402, the required token is generated and sent to service provider on system B 404.

When a system requests a service from a service provider, it often forwards some information in the request that identifies one or more business entities. These entities, such as a person or a company asset, are uniquely identified by an identifier (key) and represented as records stored in a database that the system uses. Each entity in the system may then be associated with an entity token, which can be stored as a database record, or in any other form of storage. The entity token, also referred to as an entity correlation token or correlation token, is forwarded to service providers to identify the business entities in question.

Using the example briefly described above, a correlation server 406 is deployed within the organization's network. This server is also used to handle correlation requests from service providers. A service provider, such as system B 404 will receive service requests from a service requester, such as system A 402. Each service request will have one or more entity correlation tokens embedded in it, with one entity correlation token for each entity being referred to in the service request. For each entity correlation token, the service provider will then examine the token to determine if there is an entity identifier that allows the service provider to know which business entity is being referenced. For example, the token may contain an encrypted entity identifier that tells the service provider that the entity in question is a user who is registered as user ID 1234 in the service provider's system. This will allow the service provider to continue processing and servicing the request.

When the embedded entity correlation token does not contain an appropriate entity identifier, which happens on the first time the service provider is contacted by a particular service requester for a service request on a particular entity, the service provider will pass the token to correlation server 406 and request correlation information. Correlation server 406 will then contact either the user in question, if the business entity is a user, or an administrator in the organization, to provide the entity identifier used in the service provider that identifies the entity being referred to in the service request. The user or administrator may also provide authentication and authorization information recognized by the service provider. This communication takes place over a secure communication mechanism, such as secure sockets layer (SSL). After the entity identifier and any authorization and authentication information have been obtained, the entity identifier and information is sent to the service provider to be validated. When the validation succeeds, the entity identifier is encrypted and returned to the correlation server 406 where it is added to the entity correlation token. The updated entity correlation token is then signed by the correlation server 406 to create a new entity correlation token, which is returned to the service provider. The service provider is then able to correlate the business entity. The updated entity correlation token is also forwarded to the service-requestor system, system A 402, together with the service reply.

The updated entity correlation token is then used in all future service requests that refer to that particular entity. For service providers that have already added their respective entity identifiers to the token, there is no need to refer back to correlation server 406 during future service requests that refer to that particular entity.

Figure 5:
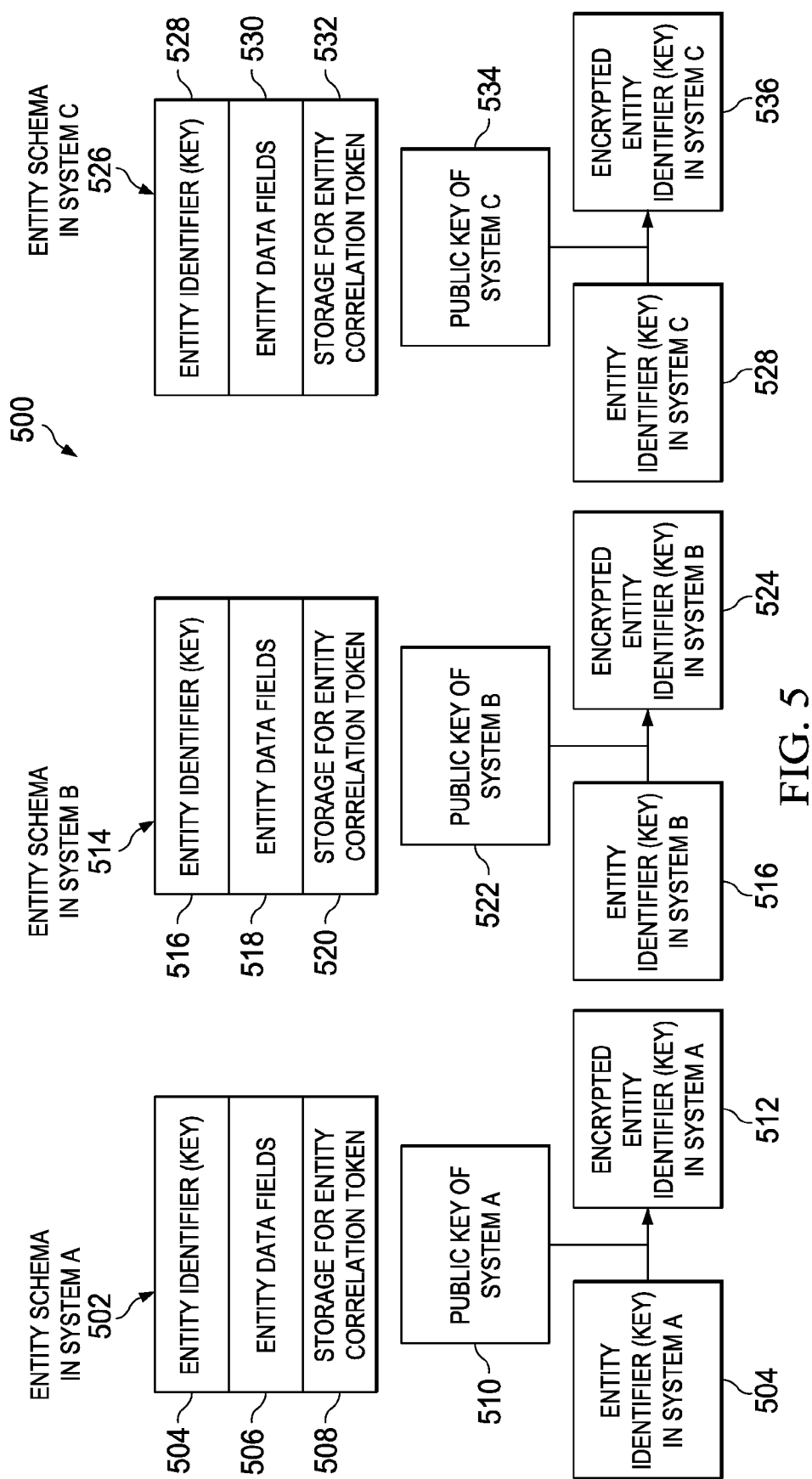
FIG. 5 is a block diagram of an example schema of data stores used in systems to store business entities, and computation of encrypted entity identifiers, in accordance with illustrative embodiments.

With reference to FIG. 5, a block diagram of an example schema of data stores used in systems to store business entities and encrypted entity identifiers is shown within a network of systems 500, in accordance with illustrative embodiments.

In the example, system A 402, system B 404 and system C 414 of FIG. 4 are used. Entity schema 502, in system A 402 comprise entity identifier (key) 504, entity data fields 506, and storage for entity correlation token 508. In a similar manner, entity schema 514 in system B 404 comprises entity identifier (key) 516, entity data fields 518, and storage for entity correlation token 520. In addition, entity schema 526 for system C 414 comprises entity identifier (key) 528, entity data fields 530, and storage for entity correlation token 532. The entity identifier and data fields are known only to the system on which they are created.

Public key 510, of system A 402, is used to process entity identifier 504 to create encrypted identifier (key) 512. In a similar manner, encrypted identifiers are created for system B 404 and system C 414. Public key 522, of system B 404, is used to process entity identifier 516 to create encrypted identifier (key) 524 and public key 534, of system C 414, is used to process entity identifier 528 to create encrypted identifier (key) 536.

Figure 6:
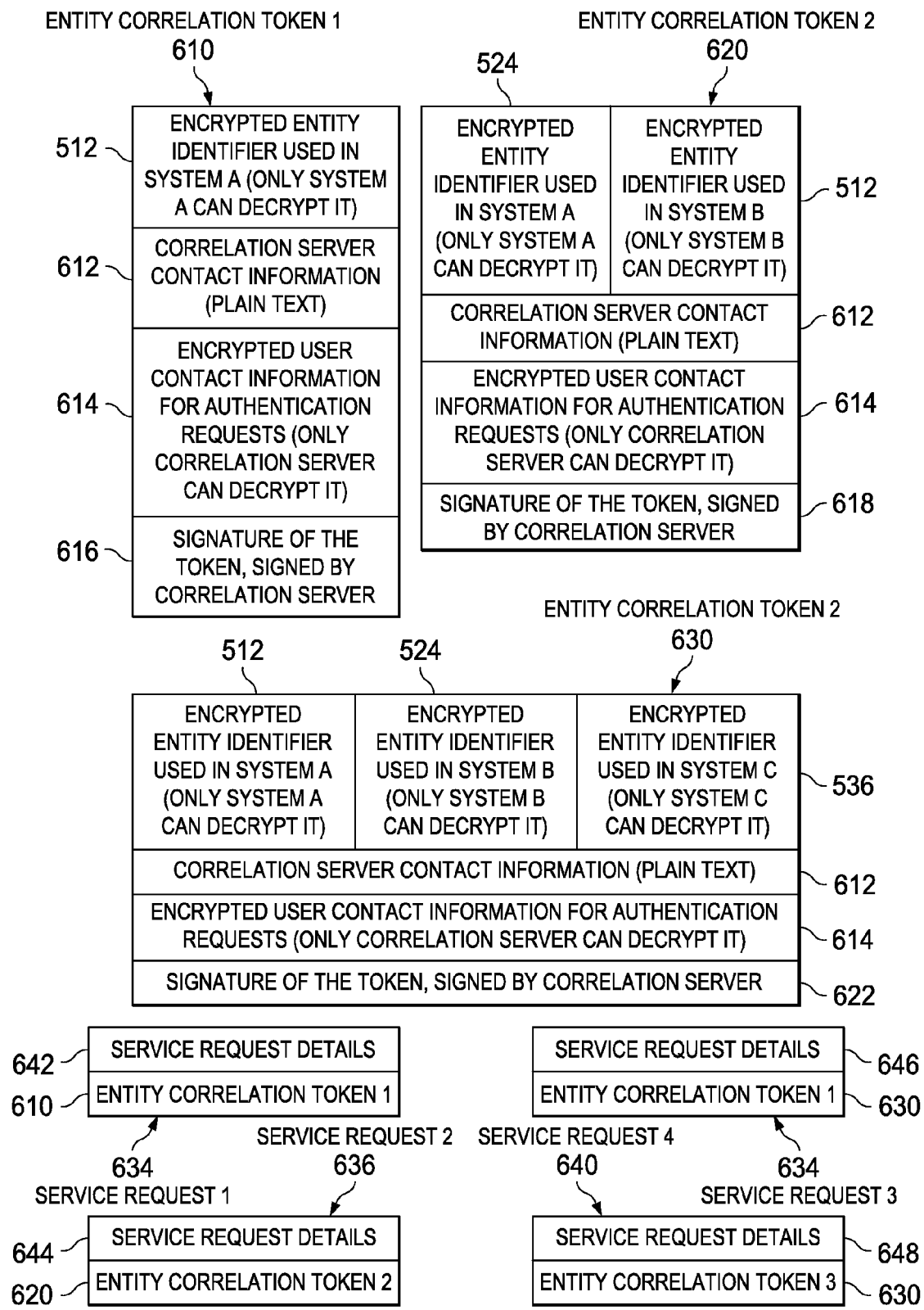
FIG. 6 is a block diagram of entity correlation tokens and service requests used in the communication flows, in accordance with illustrative embodiments.

With reference to FIG. 6, a block diagram of entity correlation tokens and service requests used in the communication flows is shown, in accordance with illustrative embodiments. FIG. 6 describes entity correlation token data structures of three systems as previously shown in FIG. 4. With regard to system A 402, entity correlation token 1 610 comprises encrypted entity identifier 512 of FIG. 5, correlation server contact information 612, encrypted user contact information for authentication requests 614, and signature of the correlation token 616, created by correlation server 406 of FIG. 4 using any digital signature technique understood by all systems participating in this arrangement. Correlation server contact information 612 is provided in plain text form. Encrypted user contact information for authentication requests 614 can only be decrypted by correlation server 406. Encrypted entity identifier 512 can only be decrypted by system A 402.

System B 404, having entity correlation token 2 620 comprises encrypted entity identifier 512 of FIG. 5, for system A 402, encrypted entity identifier 524 of FIG. 5, for system B 404, correlation server contact information 612, and encrypted user contact information for authentication requests 614, as in system A 402. Correlation server 406 of FIG. 4, also creates the signature of the correlation token 618 using any digital signature technique understood by all systems participating in this arrangement. Encrypted entity identifier 524 as used in system B 404 can only be decrypted by system B 404.

System C 414, having entity correlation token 3 630 comprises encrypted entity identifier 512 of FIG. 5, for system A 402, encrypted entity identifier 524 of FIG. 5, for system B 404, encrypted entity identifier 536 of FIG. 5, for system C 414, correlation server contact information 612, and encrypted user contact information for authentication requests 614, as in system A 402, and system B 404. Correlation server 406 of FIG. 4, also creates the signature of the correlation token 622 using any digital signature technique understood by all systems participating in this arrangement. Encrypted entity identifier 536 as used in system C 414 can only be decrypted by system C 414. Entity correlation tokens carry sufficient identifiers to enable recognition and use by each system that needs to use the token as illustrated in entity token 3 630. Entity token 3 630 enables use by all three systems.

A set of service requests comprises one or more requests, such as service request 1 634, service request 2 636, service request 3 638, and service request 4 640. Each service request data structure comprises service request details and an entity correlation token. For example, service request 1 634 comprises service request details 642 and entity correlation token 1 610. Service request 2 636 comprises service request details 644 and entity correlation token 2 620. Service request 3 638 comprises service request details 646 and entity correlation token 3 630. Service request 4 640 comprises service request details 648 and entity correlation token 3 630.

The entity correlation tokens of service request 3 638 and service request 4 640 are the same, while the details of the request are different. The different details of the request provide a flexibility to address differing requirements within the context of the same token.

Figure 7:
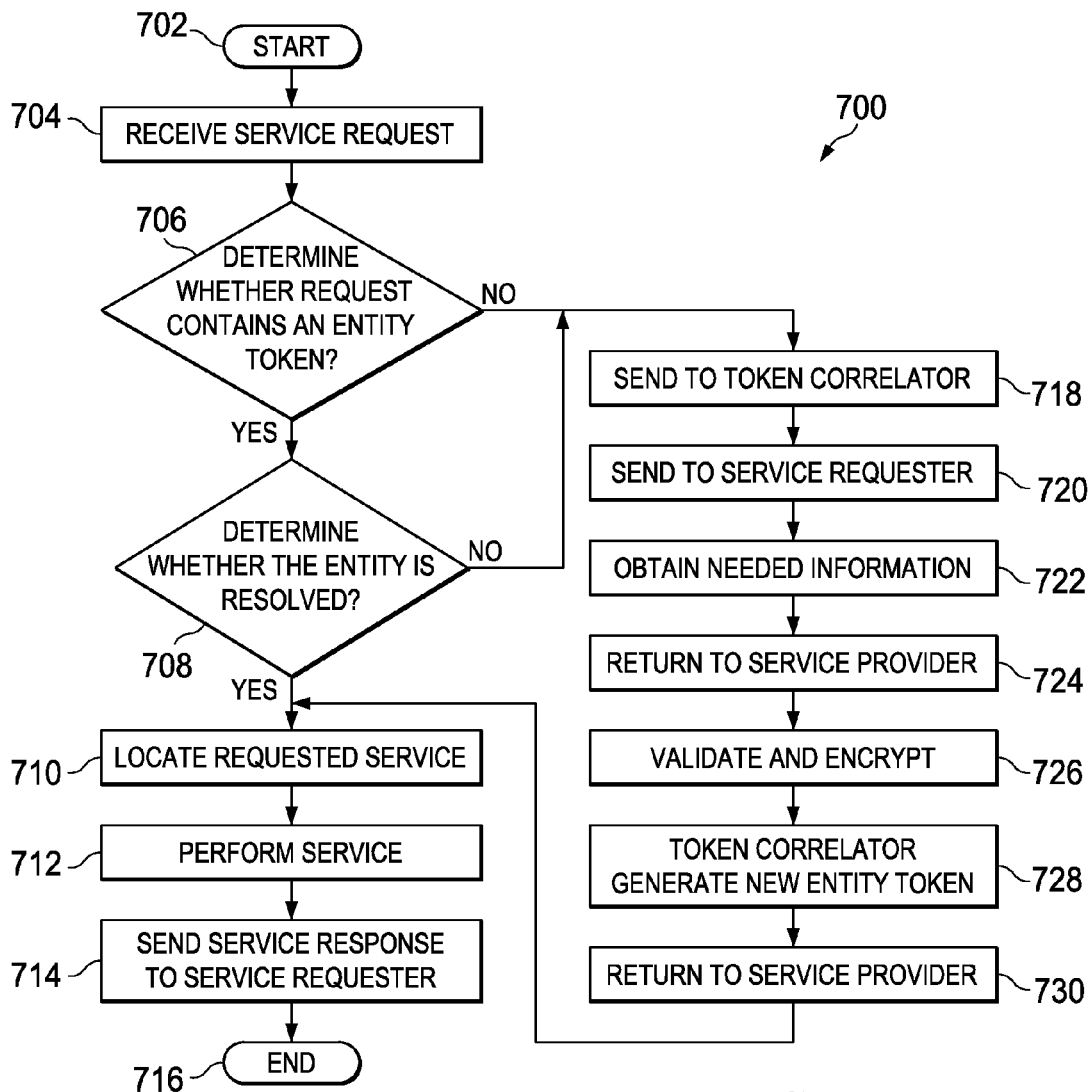
FIG. 7 is a flowchart of a service request process using a correlation manager of FIG. 3, in accordance with illustrative embodiments.

With regard to FIG. 7, a flowchart of a service request process using a correlation manager of FIG. 3 is shown, in accordance with illustrative embodiments. Service request process 700 provides an example using correlation manager 300 of FIG. 3.

Service request process 700 starts (step 702) and receives a request for service (step 704). A determination is made as to whether the request contains an entity token (step 706). If the request contains an entity token, a "yes" results. If the request does not contain a token, a "no" result is obtained. When a "no" result is obtained in step 706, the request is sent to the token correlator for processing in step 718.

When a "yes" result is obtained in step 706, a determination is made as to whether the entity token is resolved (step 708). When the entity token is resolved, a "yes" is obtained. When the entity token cannot be resolved, a "no" result is obtained. When a "yes" is obtained in step 708, locate requested services (step 710) is performed by the service provider. Upon locating the requested service, the service is performed (step 712). Send service response to the service requester occurs (step 714), with process 700 terminating thereafter (step 716).

When a "no" result is obtained in step 708, the request is sent to the token correlator, whose contact address is specified in correlation server contact information 612 of FIG. 6, for processing (step 718). The token correlator examines the request to determine which requester or authorized party, as specified in encrypted user contact information for authentication requests 614 of FIG. 6, to make a request to for more information and sends the request (step 720). The requester or authorized party associated with the requester is capable of providing the missing information. The additional information is obtained from the authorized party or the requester (step 722).

The entity information is then returned to the service provider (step 724). The service provider validates the information and encrypts the entity identifier (key) that identifies the entity (step 726). The encrypted entity identifier is sent to the token correlator for generation of a new entity token (step 728). The new entity token is returned to the service provider (step 730). The new token is returned to the service provider and locate requested services is performed (step 710) as before.

The process thus described provides a capability for services to be provided for requesters when the service requester and the service provider may use different terms for the same element. A trusted party, such as a correlation server, may then be used to provide a token to bridge between the disparate terms of the two or more parties of the service request. Encryption and digital signatures are also used to prevent tampering with tokens that are distributed for use among the requesters and providers. The correlation server, having access to information in the request that specifies the service requester, further enables resolution of a request. In the event a token cannot be resolved, the correlation server may request the service requester to provide more information to create a new token.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skill in the art, without departing from the scope and spirit of the invention. The embodiment was chosen and described in order to best explain the principles of the invention, the practical application, and to enable others of ordinary skill in the art to understand the invention for various embodiments, with various modifications as are suited to the particular use contemplated.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by, or in connection with, a computer or any instruction execution system. For the purposes of this description, a computer-usable or computer-readable medium can be any tangible apparatus that can contain, store, communicate, propagate, or transport the program for use by, or in connection with, the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments, with various modifications as are suited to the particular use contemplated.

What is claimed is:

1. A computer-implemented method for correlating entities between a service provider and a service requester, the computer-implemented method comprising;
   receiving a request for a service from a service requester;
   determining whether the request contains an entity token representative of an entity referenced by the service requester;
   responsive to a determination that the request contains an entity token representative of an entity referenced by the requester; further determining if the entity token is resolved;
   responsive to a determination that the entity token is not resolved, sending the entity token to a token correlator, wherein the token correlator requests one of the service requester and an authorized party provide entity information;
   receiving the entity information from the one of the service requester and an authorized party on the token correlator wherein the token correlator forwards the entity information to the service provider;

receiving the entity information on the service provider, validating the entity information and returning an encrypted representation of the entity information to the token correlator;

receiving the encrypted representation of the entity information on the token correlator and generating a new entity token;

returning the new token to the service provider and selectively to the authorized third party;

locating the service of the request by the service provider;

performing the service with reference to the entity represented by the new entity token to form a service response; and sending the service response to the service requester, including the new entity token.

* * * * *